(12) United States Patent
Chakra et al.

(10) Patent No.: US 11,354,486 B2
(45) Date of Patent: *Jun. 7, 2022

(54) PRESENTING A LINK LABEL FOR MULTIPLE HYPERLINKS

(71) Applicant: International Business Machines Corporation, Armonk, NY (US)

(72) Inventors: Al Chakra, Apex, NC (US); John A. Feller, Cary, NC (US); Trudy L. Hewitt, Cary, NC (US); Francesco C. Schembari, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1304 days.

This patent is subject to a terminal disclaimer.

(21) Appl. No.: 13/892,934

(22) Filed: May 13, 2013

(65) Prior Publication Data
US 2014/0337695 A1 Nov. 13, 2014

(51) Int. Cl.
| G06F 17/00 | (2019.01) |
| G06F 40/134 | (2020.01) |
| G06Q 10/10 | (2012.01) |
| G06F 16/955 | (2019.01) |
| H04L 51/04 | (2022.01) |
| H04L 51/00 | (2022.01) |
| H04L 51/52 | (2022.01) |

(52) U.S. Cl.
CPC ........ *G06F 40/134* (2020.01); *G06F 16/9558* (2019.01); *G06Q 10/107* (2013.01); *G06Q 10/10* (2013.01); *H04L 51/04* (2013.01); *H04L 51/12* (2013.01); *H04L 51/32* (2013.01)

(58) Field of Classification Search
CPC ........... G06F 17/2235; G06F 17/30882; G06F 17/30014; G06F 40/34; G06F 16/9558; G06F 40/134; G06Q 10/107; G06Q 10/10; H04L 51/04; H04L 51/12; H04L 51/32
USPC ....................................................... 715/205
See application file for complete search history.

(56) References Cited

U.S. PATENT DOCUMENTS 6,018,748 A * 1/2000 Smith ........................ 715/207
6,061,696 A * 5/2000 Lee et al. .................. 715/209
(Continued)

FOREIGN PATENT DOCUMENTS

| CN | 1323423 A | 11/2001 |
| CN | 101099152 A | 1/2008 |

OTHER PUBLICATIONS

Lowder, J., One to Many Links in Distributed Hyperdocuments, © May 14, 1996, 11 pages.*
(Continued)

*Primary Examiner* — Cesar B Paula
*Assistant Examiner* — James H. Blackwell
(74) *Attorney, Agent, or Firm* — Fabian VanCott; Steven L. Nichols

(57) ABSTRACT

Presenting a link label for multiple hyperlinks includes presenting a layered data element in an electronic message with a link label that represents multiple hyperlinks in a display, designating an active hyperlink from the multiple hyperlinks based on specific criteria associated with a recipient of the electronic message, and directing the recipient of the electronic message to an online location of the active hyperlink in response to user input selecting the link label.

20 Claims, 4 Drawing Sheets

(56) References Cited

U.S. PATENT DOCUMENTS

| | | | |
|---|---|---|---|
| 6,085,199 A * | 7/2000 | Rose | 707/823 |
| 6,085,229 A * | 7/2000 | Newman | G06F 16/9535 |
| | | | 709/203 |
| 6,098,081 A * | 8/2000 | Heidorn et al. | 715/200 |
| 6,122,647 A * | 9/2000 | Horowitz et al. | 715/205 |
| 6,134,588 A * | 10/2000 | Guenthner et al. | 709/226 |
| 6,175,862 B1 * | 1/2001 | Chen et al. | 709/218 |
| 6,182,140 B1 | 1/2001 | Feig et al. | |
| 6,192,396 B1 * | 2/2001 | Kohler | 709/206 |
| 6,211,874 B1 * | 4/2001 | Himmel et al. | 715/781 |
| 6,230,196 B1 * | 5/2001 | Guenthner | G06F 17/30893 |
| | | | 707/E17.117 |
| 6,421,726 B1 * | 7/2002 | Kenner et al. | 709/225 |
| 6,529,942 B1 * | 3/2003 | Gilbert | 709/206 |
| 6,535,912 B1 * | 3/2003 | Anupam et al. | 709/217 |
| 6,751,777 B2 * | 6/2004 | Bates et al. | 715/206 |
| 6,788,316 B1 * | 9/2004 | Ma et al. | 715/760 |
| 7,047,483 B1 * | 5/2006 | Acharya et al. | 715/273 |
| 7,062,561 B1 * | 6/2006 | Reisman | G06F 17/30 |
| | | | 707/E17.109 |
| 7,219,162 B2 * | 5/2007 | Donker et al. | 709/245 |
| 7,219,298 B2 * | 5/2007 | Bates et al. | 715/201 |
| 7,356,566 B2 * | 4/2008 | Keohane et al. | 709/206 |
| 7,406,659 B2 * | 7/2008 | Klein et al. | 715/273 |
| 7,529,804 B1 * | 5/2009 | Lu et al. | 709/206 |
| 7,548,952 B2 * | 6/2009 | Delia et al. | 709/206 |
| 7,747,574 B1 * | 6/2010 | Svendsen | 707/640 |
| 3,099,486 A1 | 1/2012 | Nakamura et al. | |
| 8,099,468 B2 * | 1/2012 | Iwasawa et al. | 709/206 |
| 8,150,979 B1 * | 4/2012 | Oldham | 709/228 |
| 8,285,716 B1 | 10/2012 | Srinivasaiah | |
| 8,312,086 B2 * | 11/2012 | Velusamy et al. | 709/206 |
| 8,341,135 B2 * | 12/2012 | Uetabira et al. | 707/705 |
| 8,412,692 B2 * | 4/2013 | Lee | 707/705 |
| 8,433,800 B2 * | 4/2013 | Chor | G06F 16/9566 |
| | | | 709/225 |
| 8,443,277 B2 * | 5/2013 | Goldman et al. | 715/206 |
| 8,656,266 B2 * | 2/2014 | Cierniak | G06F 17/2235 |
| | | | 707/726 |
| 8,799,379 B1 * | 8/2014 | Liden et al. | 709/206 |
| 8,819,232 B2 * | 8/2014 | Bellessort et al. | 709/225 |
| 8,850,301 B1 * | 9/2014 | Rose | 715/208 |
| 8,935,400 B2 * | 1/2015 | Chor | G06F 16/9566 |
| | | | 709/225 |
| 2001/0047375 A1 * | 11/2001 | Fest | 707/526 |
| 2002/0059384 A1 * | 5/2002 | Kaars | 709/206 |
| 2003/0043193 A1 * | 3/2003 | Alegria et al. | 345/764 |
| 2003/0101413 A1 * | 5/2003 | Klein et al. | 715/513 |
| 2003/0188263 A1 * | 10/2003 | Bates et al. | 715/513 |
| 2003/0200258 A1 * | 10/2003 | Hayashi | H04L 29/06 |
| | | | 709/203 |
| 2004/0019644 A1 * | 1/2004 | Fellenstein et al. | 709/206 |
| 2004/0073482 A1 * | 4/2004 | Wiggins | G06Q 30/0252 |
| | | | 705/14.5 |
| 2004/0107296 A1 * | 6/2004 | Donker et al. | 709/245 |
| 2004/0183830 A1 * | 9/2004 | Cody et al. | 345/752 |
| 2004/0215479 A1 * | 10/2004 | Dorsey et al. | 705/1 |
| 2005/0097185 A1 * | 5/2005 | Gibson et al. | 709/217 |
| 2006/0101012 A1 | 5/2006 | Carson et al. | |
| 2006/0265458 A1 * | 11/2006 | Aldrich et al. | 709/206 |
| 2007/0038717 A1 * | 2/2007 | Burkholder et al. | 709/206 |
| 2007/0083851 A1 * | 4/2007 | Huang et al. | 717/113 |
| 2007/0106736 A1 * | 5/2007 | Shepherd | 709/206 |
| 2007/0244977 A1 * | 10/2007 | Atkins | 709/206 |
| 2008/0147813 A1 * | 6/2008 | Damm | H04L 51/34 |
| | | | 709/206 |
| 2008/0215590 A1 * | 9/2008 | Thai | G06F 17/30864 |
| 2008/0222254 A1 * | 9/2008 | Mukherjee | 709/206 |
| 2008/0229218 A1 * | 9/2008 | Maeng | G06F 3/048 |
| | | | 715/760 |
| 2008/0243771 A1 * | 10/2008 | Prahlad et al. | 707/2 |
| 2009/0099906 A1 | 4/2009 | Kirley | |
| 2009/0150806 A1 * | 6/2009 | Evje et al. | 715/762 |
| 2009/0307322 A1 * | 12/2009 | Iwasawa et al. | 709/206 |
| 2009/0319623 A1 * | 12/2009 | Srinivasan et al. | 709/206 |
| 2009/0327864 A1 * | 12/2009 | Bogestam et al. | 715/234 |
| 2010/0030860 A1 * | 2/2010 | Iwasawa et al. | 709/206 |
| 2010/0100599 A1 * | 4/2010 | Witzany | 709/206 |
| 2010/0121718 A1 * | 5/2010 | AlanDietz | G06F 16/972 |
| | | | 705/14.58 |
| 2010/0162093 A1 * | 6/2010 | Cierniak | G06F 17/30864 |
| | | | 715/205 |
| 2010/0287192 A1 * | 11/2010 | Kottomtharayil et al. | 707/769 |
| 2011/0078586 A1 * | 3/2011 | Wittig | G06Q 10/107 |
| | | | 715/752 |
| 2011/0113104 A1 * | 5/2011 | Bhogal | G06Q 10/107 |
| | | | 709/206 |
| 2012/0095837 A1 * | 4/2012 | Bharat et al. | 705/14.54 |
| 2012/0117458 A1 * | 5/2012 | Holloway et al. | 715/234 |
| 2013/0067303 A1 * | 3/2013 | Kantor et al. | 715/205 |
| 2013/0238727 A1 * | 9/2013 | Martinez et al. | 709/206 |
| 2014/0289614 A1 * | 9/2014 | Ayers | 715/247 |

OTHER PUBLICATIONS

Dynamic URL Referral, IPCOM000223864D, December 4, 2012, IP.com.

\* cited by examiner

PRESENTING A LINK LABEL FOR MULTIPLE HYPERLINKS

BACKGROUND

The present invention relates to presenting a link label for multiple hyperlinks, and more specifically, to presenting a link label for multiple hyperlinks in electronic messages.

Email is a system where a sender can send an electronic message to a recipient over a network, such as the internet. Generally, the sender will compose a message and address the message to an electronic location that is accessible to the intended recipient. If desired, the sender can direct the recipient to an online resource, such as a website, by attaching a hyperlink to the email. The hyperlink points to the electronic address of the website that the sender desires to share with the recipient. In the received electronic message, the recipient can select the hyperlink and be directed to the website. The hyperlink provides the recipient a quick way of accessing the online resource. Also, the sender benefits because the sender does not have to summarize the website's contents in the electronic message to share that content with the recipient.

BRIEF SUMMARY

A system for presenting a link label for multiple hyperlinks includes a presenting engine to present a layered data element in an electronic message with a link label that represents multiple hyperlinks, a designating engine to designate an active hyperlink from the multiple hyperlinks based on specific criteria associated with a recipient of the electronic message, and a directing engine to direct the recipient of the electronic message to an online location of the active hyperlink in response to user input selecting the link label.

A computer program product for presenting a link label for multiple hyperlinks includes a tangible computer readable storage medium where the tangible computer readable storage medium has computer readable program code embodied therewith. The computer readable program code has program instructions that, when executed, causes a processor to present a layered data element in an electronic message with a link label that represents multiple hyperlinks, designate an active hyperlink from the multiple hyperlinks based on specific criteria associated with a recipient of the electronic message, and display content to an online location of the active hyperlink in response to user input selecting the link label.

A system for presenting a link label for multiple hyperlinks includes a generating engine to generate a layered data element with a link label that represents multiple hyperlinks, a presenting engine to present the link label in an electronic message, and a designating engine to designate an active hyperlink from the multiple links based on criteria about a recipient of the electronic message.

A method for presenting a link label for multiple hyperlinks includes presenting a layered data element in an electronic message with a link label that represents multiple hyperlinks in a display, designating an active hyperlink from the multiple hyperlinks based on specific criteria associated with a recipient of the electronic message, and directing the recipient of the electronic message to an online location of the active hyperlink in response to user input selecting the link label.

A method for presenting a link label for multiple hyperlinks includes detecting an electronic message to an electronic address where the electronic message includes a layered data element, presenting a single link label for multiple hyperlinks based on the layered data element in a display, designating an active hyperlink from the multiple hyperlinks based on specific criteria associated with the electronic address, and directing a recipient of the electronic message to an online location of the active hyperlink in response to user input selecting the single link label.

A method for presenting a link label for multiple hyperlinks includes generating a layered data element to have a single link label associated with multiple hyperlinks based on user input, designating a single active hyperlink from the multiple hyperlinks based on specific criteria associated with the electronic address, and displaying content of an online location of the active hyperlink in response to user input selecting the single link label in a display.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
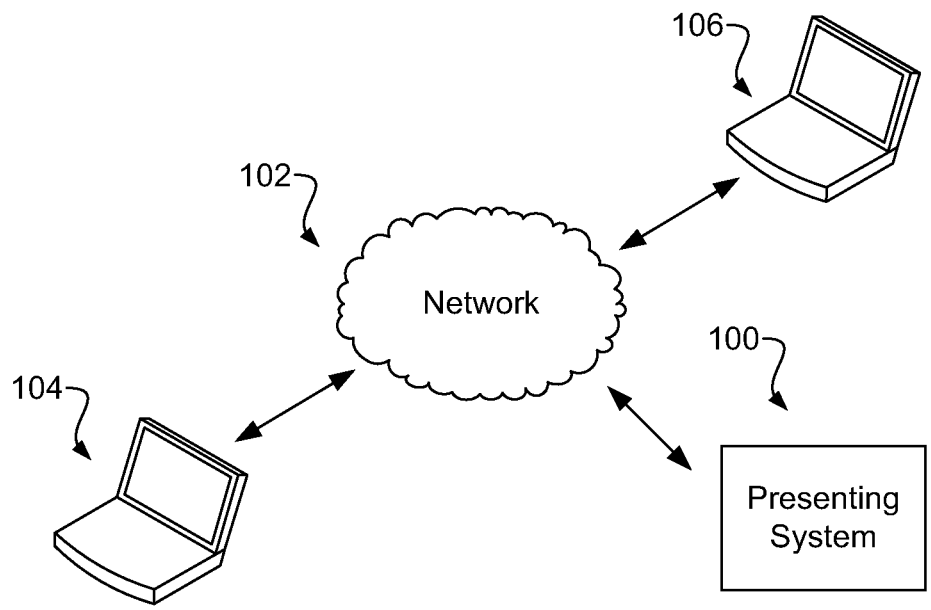
FIG. 1 is a diagram of an example of a system for presenting a link label that represents multiple hyperlinks according to one example of the principles described herein.

The present specification describes a system and a method for presenting a link label that represents multiple hyperlinks in an electronic message such that the recipient of the electronic message is directed to the content of an active hyperlink of the link label in response to selecting the link label.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification may take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

The hyperlink contains a link label that is visible to the sender and/or recipient in the electronic message. The link label can be associated with a single hyperlink that points to a single online resource at an online location. In some circumstances, the sender may desire to share content with the recipient, but the specific content that the sender desires to send may vary depending on the recipient's geographic location, spoken language, profession, preference, social networking profile, or other criteria. For example, the sender may be an employer of a multinational corporation. The employer may desire to send a hyperlink in an email to the employees to update them on an employee policy. However, the employees may speak different languages. In such a circumstance, the employer may have an online resource that describes the updated policy for each language spoken by the employees. Thus, to provide a hyperlink for each language spoken by the employees, the employer may have to insert a hyperlink for each of the language specific online resources. For a large multinational corporation, the number of online resources reflecting each language may be significant.

The principles described herein include a method for presenting a link label for multiple hyperlinks in the electronic message. Such a method may include presenting a layered data element in an electronic message with a link label that represents multiple hyperlinks in a display, designating an active hyperlink from the multiple hyperlinks based on specific criteria associated with a recipient of the electronic message, and directing the recipient of the electronic message to an online location of the active hyperlink in response to user input selecting the link label.

Thus, the employer may attach the layered data element which will present a single link label. The link label may visually appear to be a single hyperlink, but the link label actually is associated with multiple hyperlinks. Each of the hyperlinks may point to the online resources for each of the employees' languages. The employer may send the electronic message to the company employees. Thus, the same electronic message will go to employees who speak different languages. In response to opening the electronic messages, the employees will select the link label, which appears to the employees to be a single hyperlink. An employee in a country that speaks a first language will be directed to a first online resource that describes the company policy in the first language. However, a second employee from a second country that speaks a second language will select the same link label, but will be directed to a second online resource that describes the company policy in the second language. Thus, the recipient does not have to determine which of the hyperlinks from the employer to select, but the system automatically determines which hyperlink is appropriate for the recipient.

The principles described herein determine the appropriate hyperlink by considering at least one criterion. The criteria may include language, geographic location, profession, preferences, social profile information, other criteria, or combinations thereof. In this example, the employer is spared from having to input each hyperlink into the email. Further, the employees are spared from having to determine which of the hyperlinks are appropriate for them.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system (100) for presenting a link label that represents multiple hyperlinks. In this example, the presenting system (100) is in communication though a network (102) with a sender device (104) and a recipient device (106). A sender may compose an electronic message with the sender device (104) and send the electronic message to an electronic address associated with an intended recipient. The intended recipient may access the electronic message on the recipient device (106). If desired, the sender includes a layered data element in the electronic message, which can be viewed and selected by the recipient.

The sender device (104) and the recipient device (106) may be any appropriate device that can send and/or receive electronic messages. For example, a non-exhaustive list of devices that may be suitable as sender devices (104) and/or recipient devices (106) includes laptops, desktops, personal computers, phones, electronic tablets, watches, wearable computing devices, personal digital assistants, other electronic devices, and combinations thereof. The electronic message may be an email, a text message, an instant message, a social networking message, another type of message, or combinations thereof. The system used to send the electronic message may be controlled by a network component, such as a server or another network component. In other examples, the electronic message may be controlled locally on either the sender device (104) and/or the recipient device (106).

The presenting system (100) may provide the sender the capability to generate a layered data element for inclusion in the electronic message. For example, the sender may access the presenting system (100) over the network (102) through the sender device (104) for generating layered data elements. The sender may remotely use the programs of the presenting system (100) to instruct the presenting system (100) on which hyperlinks to include in the layered data element. Further, the sender may instruct the presenting system (100) on how the link label will appear to the recipient. For example, the sender may specify that the link label is a block of text, an image, an electronic icon, a symbol, a group of symbols, another type of link label, or combinations thereof.

The sender may specify which hyperlinks to include in the layered data element. For example, the sender may select the hyperlinks by using non-programmatic user instructions to select the hyperlinks. A non-programmatic user instruction may include drag and drop instructions, clicking instructions, audible command instructions, hand motion gesture instructions, other instructions that do not force the sender to insert the hyperlinks into code, or combinations thereof.

The sender may also specify the criteria to use to determine which of the hyperlinks is appropriate for which of the intended recipients. For example, the sender may instruct the presenting system (100) that a specific hyperlink is to be active for recipients from a first country, while another hyperlink is to be active for recipients in another country. In other examples, the sender may instruct the presenting system (100) to designate active hyperlinks based on other criteria, such as geographic locations, languages, preferences, information from a social networking profile, age, gender, interests, profession, education level, employer, educational institution attended, other criteria, or combinations thereof.

The presenting system (100) may be notified when the electronic message is sent. In response to determining that the electronic message is sent, the presenting system (100) may determine each of the recipients to which the electronic message was sent. Accordingly, the presenting system (100) also determines the characteristics of the recipients to determine which of the hyperlinks of the layered data element to include as the active hyperlink. The presenting system (100) may use any appropriate source or mechanism for determining the characteristics of the recipients. For example, if the recipients are part of an organization, such as a multinational corporation, the presenting system (100) may access a database that contains the geographic location, language, profession, and other information about the recipients. In other examples, the presenting system (100) may analyze information from a recipient's social networking profile.

In one example, the sender uses a social networking website to send the electronic message to another member of the same social networking website. In such an example, the presenting system (100) can be part of that social networking website and can glean information in the recipient's profile.

In yet other examples, the presenting system (100) can use information in the recipient's electronic message, such as domain, top-level domains, local parts, hostnames, other parts of email addresses, or combinations thereof. In yet other examples, the presenting system (100) may search the internet or other sources looking for characteristics of the recipient based on information available about the recipient. For example, if the electronic address for the recipient has an unknown domain name, the presenting system (100) may query the internet to derive information about the domain name.

Based on the information available about the recipient and based on the criteria established by the sender, the presenting system (100) designates a hyperlink from the multiple hyperlinks associated with the layered data element as an active hyperlink. In some examples, a single hyperlink is designated as the active hyperlink. In other examples, the presenting system (100) may designate several hyperlinks as active hyperlinks. For example, just one hyperlink may match the criteria established by the sender. As a result, that single hyperlink will be selected as the active hyperlink. However, if multiple hyperlinks match the criteria established by the sender, the presenting system (100) may designate each of the compatible hyperlinks as active hyperlinks. In some examples, the process of determining which hyperlinks match the criteria established by the sender includes excluding hyperlinks that do not match the criteria. In other examples, the process of determining which hyperlinks match the criteria involves including just those hyperlinks that match or mostly match the established criteria. In some examples, the presenting system (100) selects the most compatible hyperlink out of multiple hyperlinks that match the established criteria based on a designation policy. In such an example, a single hyperlink is selected as the active hyperlink even though multiple hyperlinks match the established criteria. The presenting system (100) may be programmed to select the most relevant hyperlink to be the active hyperlink, or the sender may request that just a single hyperlink be selected.

While this example has been described specifically with reference to the sender establishing the criteria, any appropriate party may establish the criteria. For example, in a corporate setting, an appointed employee or executive may establish the criteria. In such an example, the presenting system (100) uses the established criteria. In other examples, the presenting system (100) includes default criteria that may be used in the absence of instructions from the sender or other appropriate party.

In some examples, a learning mechanism is used by the presenting system (100) to establish or refine the criteria. For example, the learning mechanism may solicit feedback from recipients about the active hyperlink. If the active hyperlink fails to point the recipient to useful online resources, the presenting system (100) may change the policies for designating the active hyperlink. For example, the learning mechanism may determine that a particular recipient travels frequently and, as a result, is typically in a certain nation although it would appear otherwise from the information available to the presenting system (100). In other examples, the recipient may not speak the official language of the nation in which the recipient resides. The learning mechanism may create rules that are specific to individual recipients as well as maintain general rules that are applicable to a wide variety of recipients.

In response to receiving the electronic message, the recipient may select the link label in the body of the received electronic message. If the layered data element includes a single active hyperlink, the presenting system (100) causes the recipient to be directed to the contents of the online resources pointed to by the active hyperlink. The presenting system (100) may direct the recipient to the online resource by following the hyperlink, opening the contents of the online resources associated with the hyperlink in a new window, using another mechanism, or combinations thereof.

If multiple hyperlinks are designated as active hyperlinks, the presenting system (100) may cause a drop down menu of the active hyperlinks to appear adjacent the link label in response to the recipient's selection of the link label. In such an example, the presenting system (100) has filtered out those hyperlinks that are deemed by the presenting system (100) to be less relevant to the recipient. In some circumstances, the presenting system (100) may have instructions to reduce the number of active hyperlinks to as small of a number as possible so that just the most relevant hyperlinks are presented to the recipient.

While this example has been described with specific reference to the presenting system (100) being in communication with the sender device (104) and the recipient device (106) over a network (102), the presenting system (100) may be located in any appropriate location. For example, the presenting system (100) may be located physically or virtually on the sender device (104) and/or the recipient device (106). In some examples, the presenting system (100) is distributed physically and/or virtual across multiple devices which may include the sender device (104), the recipient device (106), a network device, a virtual device, another type of device, or combinations thereof.

Figure 2:
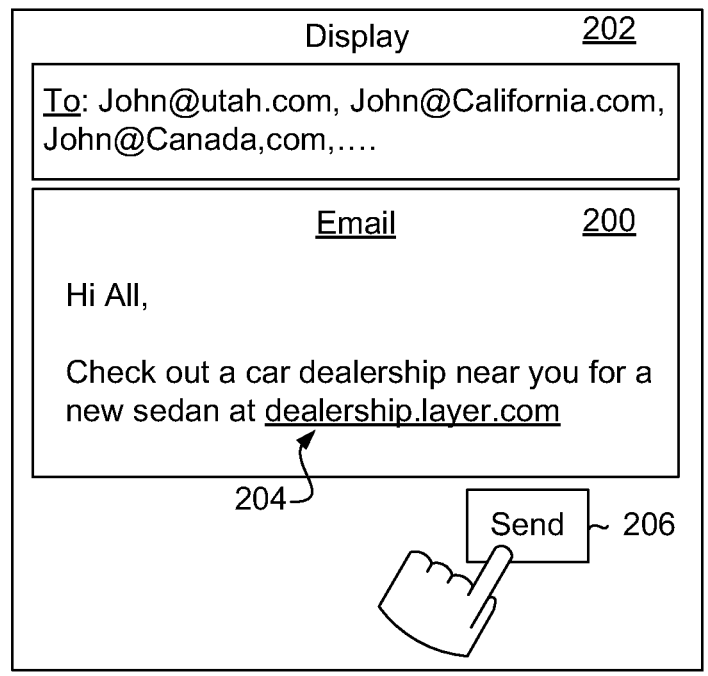
FIG. 2 is a diagram of an example of sending an electronic message with a layered data element that includes hyperlinks according to one example of the principles described herein.

FIG. 2 is a diagram of an example of sending an electronic message (200) with a layered data element that includes multiple hyperlinks. In this example, a sender has composed an electronic message (200), which is displayed in a display (202). The electronic message (200) includes a layered data element that includes multiple dealerships from which a recipient can purchase an automobile. A link label (204) of the layered data element is displayed in the body of the electronic message (200).

The sender may have created the layered data element or the sender may have inserted the layered data element from an available source. For example, the presenting system may include a library of previously generated layered data elements from which the sender can select. In examples where the sender generates the layered data element, the sender can use non-programmatic user instructions to generate the layered data element. Such non-programmatic user instructions may include any appropriate instructions that do not force the sender input the criteria and/or hyperlinks into code. A non-exhaustive list of non-programmatic user instructions include dragging and dropping instructions, key board instructions, click instructions, audible instruction, movement gesture instructions, other non-programmatic user instructions, or combinations thereof.

A recipient field in the display (202) includes several addresses of recipients that the sender intends to send the electronic message. In this example, the domain names provide information about the location of the recipients. For example, the address of John@California.com is determined by the presenting system to indicate that the recipient is located in California, U.S.A. In response to the sender selecting the send button (206), the electronic message is sent to the indicated recipients.

Figure 3:
FIG. 3 is a diagram of an example of a layered data element according to one example of the principles described herein.

FIG. 3 is a diagram of an example of a layered data element (300) according to one example of the principles described herein. In this example, the layered data element (300) includes multiple hyperlinks (302) to different websites that are based on location. For example, the www.dealership.washington.com is a website for a dealership located in Washington, U.S.A. However, each of the hyperlinks (302) is associated with the same link label (204, FIG. 2) from the example of FIG. 2. Thus, the sender is relieved from manually matching the intended recipients with appropriate hyperlinks. The sender is enabled to send a single electronic message to multiple recipients without including multiple hyperlinks in the electronic message. Additionally, the principles described herein also allow the sender to send a more professional looking message because the electronic message is not cluttered with multiple, confusing hyperlinks.

Figure 4:
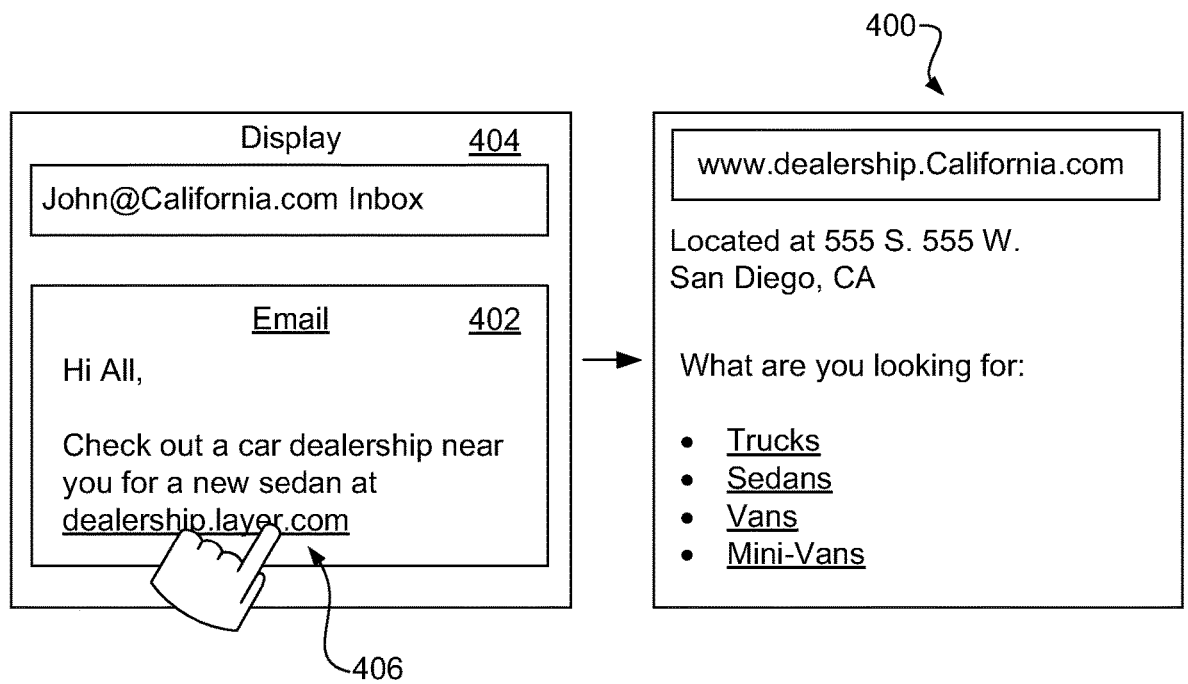
FIG. 4 is a diagram of an example of directing to an online location of an active hyperlink according to one example of the principles described herein.

FIG. 4 is a diagram of an example of directing to an online location (400) of an active hyperlink. In this example, the recipient has opened the electronic message (402), which is displayed in a display (404).

The recipient's electronic address is John@California.com. Based on the recipient's electronic address, the presenting system determines that the recipient is located in California, U.S.A. In this example, a criterion for the activated hyperlink is geographic location. Thus, the presenting system designates the hyperlink appropriate for a California based recipient as the activated hyperlink. In this example, the active hyperlink is www.dealership.California.com. However, other recipients not determined to be based in California will not have a hyperlink appropriate for California based recipients designated as the active hyperlink. While this example depicts the presenting system using information in the electronic address's domain, any appropriate type of information may be used to determine a geographic location or other characteristics of the recipient.

In response to the recipient selecting the link label (406) in the electronic message, the presenting system causes the browser of the display to go to the active hyperlink's address. Thus, the display (404) displays content found at the website of www.dealership.California.com.

In this example, the presenting system designated a single active hyperlink. As a result, the presenting system took the recipient directly to the online content associated with the active hyperlink. The presenting system may have determined that just the www.dealership.California.com hyperlink matched the criteria established for designating the active hyperlink by excluding the other hyperlinks that suggested their content was specific to recipients of other locations. Thus, the www.dealership.California.com hyperlink was designated by a process of elimination. In other examples, the presenting system determines the www.dealership.California.com hyperlink positively matches the established criteria because the recipient appears to be based in California and the www.dealership.California.com hyperlink contains content specific to California based recipients.

In some examples, more than one hyperlink may satisfy the criteria for being designated as the active hyperlink. In such a situation, a designation policy may determine whether multiple hyperlinks will be designated as active hyperlinks or whether just one of the compatible hyperlinks will be designated as the active hyperlink. If just a single hyperlink is to be designated as the active hyperlink per the designation policy, the established criteria may include a set of minimal criteria. If a single hyperlink satisfies the minimum criteria, that single hyperlink will be designated as the active hyperlink. If more than one hyperlink satisfies the minimal criteria, then a higher level of criteria may be analyzed to determine which of the hyperlinks is more relevant to the recipient. In other examples, each or a subset of the hyperlinks is scored based on matching the established criteria, and the hyperlink with the highest score is designated as the active hyperlink.

Figure 5:
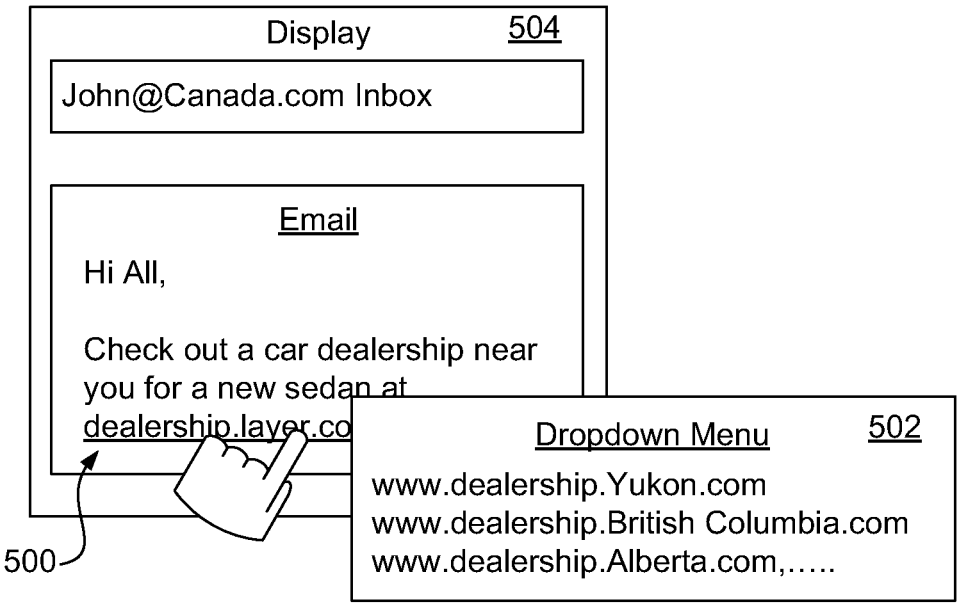
FIG. 5 is a diagram of an example of directing to an online location of an active hyperlink according to one example of the principles described herein.

FIG. 5 is a diagram of an example of directing to an online location of an active hyperlink. In this example, the layered data element has multiple hyperlinks designated as active hyperlinks. In this example, the recipient's electronic address is John@Canada.com.

In response to the recipient selecting the link label (500), the presenting system causes a drop down menu (502) to appear in the display (504) adjacent the link label (500). Here, the recipient appears to be based in Canada, and three of the hyperlinks appear to be suitable for a recipient based in Canada. Further, the designating policy in this example allows for multiple hyperlinks to be designated as active hyperlinks. As a result, the presenting system designated each of the three compatible hyperlinks as active hyperlinks which are displayed in the drop down menu (502). The recipient can select which of the displayed active hyperlinks that appears to be the most relevant.

While this example has been described with reference to a specific mechanism for allowing a recipient to select one of multiple active hyperlinks, any appropriate mechanism for allowing the user to select one of the multiple hyperlinks may be used in accordance with the principles described herein. Further, while the examples above have been described with reference to specific mechanism of directing the recipient to content associated with the active hyperlink, any appropriate mechanism may be used in accordance with the principles described herein.

Figure 6:
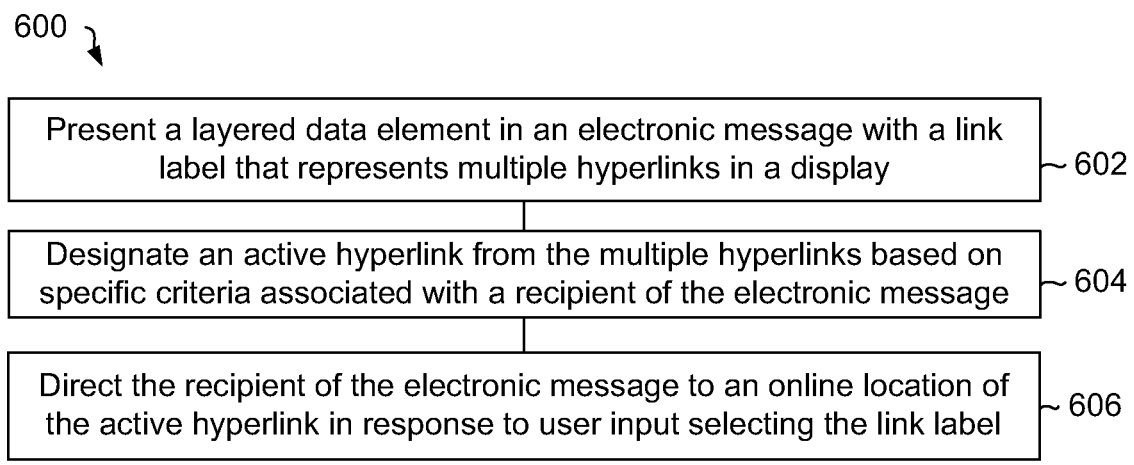
FIG. 6 is a diagram of an example of a method for presenting a link label for multiple hyperlinks according to one example of the principles described herein.

FIG. 6 is a diagram of an example of a method (600) for presenting a link label for multiple hyperlinks. In this example, the method (600) includes presenting (602) a layered data element in an electronic message with a link label that represents multiple hyperlinks in a display, designating (604) an active hyperlink from the multiple hyperlinks based on specific criteria associated with a recipient of the electronic message, and directing (606) the recipient of the electronic message to an online location of the active hyperlink in response to user input selecting the link label.

The layered data element may be generated by the sender or another party. A creator of the layered data element may use non-programmatic user instructions to associate at least one of the multiple hyperlinks with the layered data element. Non-programmatic user instructions may include dropping a hyperlink into a layered data element field, using a key stroke to select the hyperlink, using user input, using other non-programmatic instructions, or combinations thereof.

The link label may be any appropriate label that a recipient can recognize as a label for the layered data element. For example, the link label may be a picture, block of text, a quick response (QR) code, a symbol, a group of symbols, another type of label, or combinations thereof. Further, the active hyperlink can point to any appropriate online resource. For example, an active hyperlink can point to a website, an image, a file, a document, an audio file, a video, another online resource, or combinations thereof.

The specific criteria may be established by the sender, another party, or the presenting system. The presenting system may include default criteria that are applied to the layered data element. Further, the presenting system may include a learning mechanism that adjusts the criteria based on feedback from the recipient or other sources to improve the criteria and/or designation policies. The specific criteria may include a geographic location of a user of the electronic address, a profession of the user of the electronic address, a language of the user of the electronic address, preferences of the user of the electronic address, profile data of the user of the electronic address, other criteria, or combinations thereof.

Designating the active hyperlink from the multiple hyperlinks can include identifying a subset of the multiple hyperlinks determined to be suitable for the electronic account. In some examples, designating the active hyperlink can include designating a single hyperlink to be the active hyperlink. In other examples, multiple hyperlinks are designated as active hyperlinks.

Directing the recipient of the electronic message to the online location of the active hyperlink in response to selecting the link label includes displaying a drop down menu that includes the active hyperlink. In other examples, directing the recipient of the electronic message to the online location includes automatically displaying content of the active hyperlink.

Figure 7:
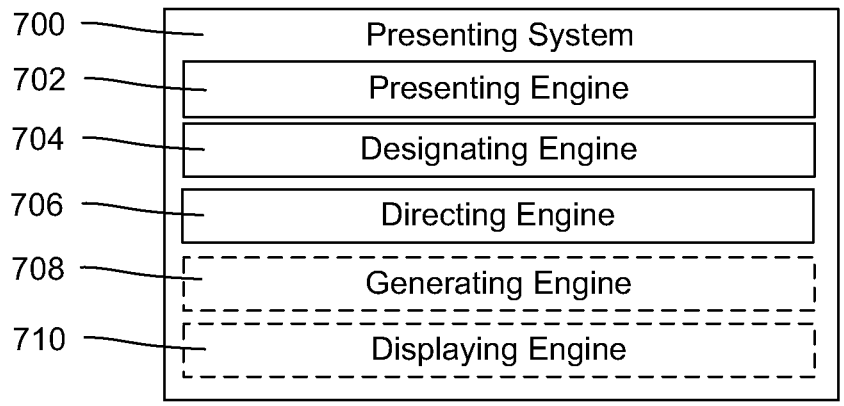
FIG. 7 is a diagram of an example of a presenting system according to one example of the principles described herein.

FIG. 7 is a diagram of an example of a presenting system (700). The presenting system (700) includes a presenting engine (702), a designating engine (704), and a directing engine (706). In this example, the presenting system (700) also includes a generating engine (708) and a displaying engine (710). The engines (702, 704, 706, 708, 710) refer to a combination of hardware and program instructions to perform a designated function. Each of the engines (702, 704, 706, 708, 710) may include a processor and memory. The program instructions are stored in the memory and cause the processor to execute the designated function of the engine.

The presenting engine (702) presents the embedded layered data element in an electronic message as a link label that represents the multiple hyperlinks. The designating engine (704) designates at least one of the hyperlinks as an active hyperlink, and the directing engine (706) directs the recipient to the contents of the online resource associated with the active hyperlink. Directing the recipient may include following the electronic address associated with the active hyperlink so that the contents of the online resource appear in the display. Additionally, directing the recipient to the online resource may include presenting to the recipient multiple active hyperlinks from which the recipient can choose the hyperlink that appears to be appropriate. Presenting the multiple active hyperlinks may include presenting them in a drop down menu or another format in response to selecting the link label.

The generating engine (708) generates the layered data element in response to the sender or another party giving the presenting system (700) non-programmatic user instructions. The user instructions can include instructions for which hyperlinks to associate with the layered data element, for the criteria for designating active hyperlinks, for the sources to determine characteristics about the recipients, for directing the recipient to the online resource, for specific details of the designation policy, for other instructions, or combinations thereof. The display engine displays the contents of the online resource in response to the recipient being directed to the online resource.

Figure 8:
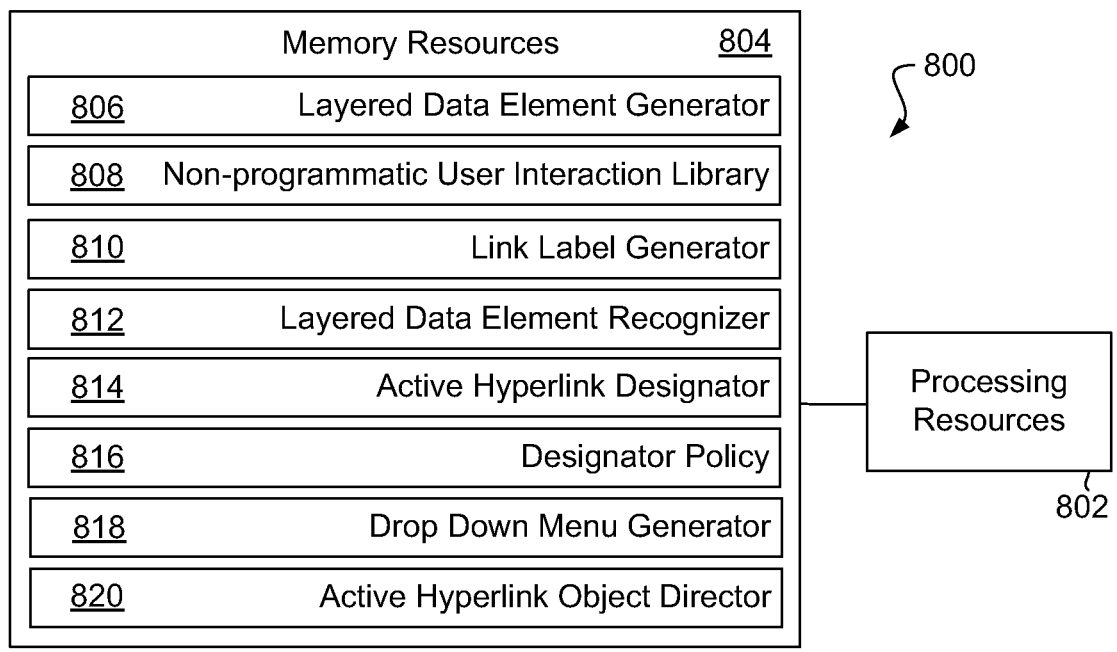
FIG. 8 is a diagram of an example of a presenting system according to one example of the principles described herein.

FIG. 8 is a diagram of an example of a presenting system (800). In this example, the presenting system (800) includes processing resources (802) that are in communication with memory resources (804). Processing resources (802) include at least one processor and other resources used to process programmed instructions. The memory resources (804) represent generally any memory capable of storing data such as programmed instructions or data structures used by the presenting system (800). The programmed instructions shown stored in the memory resources (804) include a layered data element generator (806), a link label generator (810), a layered data element recognizer (812), an active hyperlink designator (814), a designator policy (816), a drop down menu generator (818), and an active hyperlink object director (820). The data structures shown stored in the memory resources (804) include a non-programmatic user interaction library (808).

The memory resources (804) include a computer readable storage medium that contains computer readable program code to cause tasks to be executed by the processing resources (802). The computer readable storage medium may be tangible storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic storage media, other types of memory, or combinations thereof.

The layered data element generator (806) represents programmed instructions that, when executed, cause the processing resources (802) to generate a layered data element based on user input. The input can be input recognized from the non-programmatic user interaction library (808). The link label generator (810) represents programmed instructions that, when executed, cause the processing resources (802) to generator a link label.

The layered data element recognizer (812) represents programmed instructions that, when executed, cause the processing resources (802) to recognize layered data elements in electronic messages so that the active hyperlink can be designated. The active hyperlink designator (814) represents programmed instructions that, when executed, cause the processing resources (802) to designate an active hyperlink based on the designator policy (816).

The drop down menu generator (818) represents programmed instructions that, when executed, cause the processing resources (802) to generate a drop down menu to display multiple active hyperlinks in situations where the layered data element is associated with multiple active hyperlinks. The active hyperlink object director (820) represents programmed instructions that, when executed, cause the processing resources (802) to direct the recipient to the object of the active hyperlink in response to the recipient selecting the link label.

Further, the memory resources (804) may be part of an installation package. In response to installing the installation package, the programmed instructions of the memory resources (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (802) and the memory resources (804) are located within the same physical component, such as a server, or a network component. The memory resources (804) may be part of the physical component's main memory, caches, registers, non-volatile memory, or elsewhere in the physical component's memory hierarchy. Alternatively, the memory resources (804) may be in communication with the processing resources (802) over a network. Further, the data structures, such as the libraries and may be accessed from a remote location over a network connection while the programmed instructions are located locally. Thus, the presenting system (800) may be implemented on a user device, on a server, on a collection of servers, or combinations thereof.

The presenting system (800) of FIG. 8 may be part of a general purpose computer. However, in alternative examples, the presenting system (800) is part of an application specific integrated circuit.

While the examples above have been described with reference to specific mechanisms for generating a layered data element, any appropriate mechanism for generating a layered data element may be used in accordance with the principles described herein. Further, while the examples above have been described with reference to specific mechanisms for designating the active hyperlink, any appropriate mechanism for designating an active hyperlink may be used in accordance with the principles described herein. Also, while the examples above have been described with reference to specific mechanisms for directing a recipient to online resources associated with the active hyperlink, any appropriate mechanism for directing the recipient may be used in accordance with the principles described herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for presenting a link label for multiple hyperlinks, comprising:
   a presenting engine to:

present a layered data element in an electronic message with a link label that represents multiple hyperlinks in a display;

a designating engine to designate an active hyperlink from said multiple hyperlinks based on specific criteria associated with a recipient of said electronic message, wherein:

the specific criteria comprises a score associated with the hyperlinks, the hyperlinks being scored based on a matching of the criteria; and the hyperlink with the highest score is designated as the active hyperlink;

a directing engine to direct said recipient of said electronic message to an online location of said active hyperlink in response to user input selecting said link label; and a learning mechanism to adjust criteria associated with a recipient of the electronic message and used by the designating engine to designate the active hyperlink to create a first set of rules that are specific to individual recipients and a second set of rules that are applicable to a variety of recipients, wherein:

the learning mechanism utilizes information about the recipient's feedback regarding previously-selected active hyperlinks and characteristics of the recipient, the characteristics of the recipient defining the criteria; and the criteria is adjusted as the characteristics of the recipient change.

2. The system of claim 1, further comprising a generating engine to generate said layered data element.

3. The system of claim 2, wherein said generating engine to further generate said layered data element based on non-programmatic user instructions.

4. The system of claim 3, wherein said non-programmatic user instructions include dragging and dropping instructions, key board instructions, click instructions, audible instructions, movement gesture instructions, or combinations thereof.

5. The system of claim 1, wherein said link label is a picture, block of text, quick response (QR) code, a symbol, a group of symbols, or combinations thereof.

6. The system of claim 1, wherein said criteria includes a geographic location of said recipient, a profession of said recipient, a language of said recipient, a preference of said recipient, profile data of said recipient, or combinations thereof.

7. The system of claim 1, wherein said active hyperlink points to a website, an image, a file, a document, audio file, a video, or combinations thereof.

8. The system of claim 1, wherein said active hyperlink is a single hyperlink.

9. The system of claim 1, wherein said active hyperlink is part of a subset of said multiple hyperlinks compatible with said recipient.

10. A computer program product for presenting a link label for multiple hyperlinks, comprising:

a non-transitory computer readable storage device, said tangible computer readable storage medium comprising computer readable program code embodied therewith, said computer readable program code comprising program instructions that, when executed, causes a processor to:

present a layered data element in an electronic message with a link label that represents multiple hyperlinks in a display;

designate an active hyperlink from said multiple hyperlinks based on specific criteria associated with the recipient of said electronic message, wherein:

the specific criteria comprises a score associated with the hyperlinks, the hyperlinks being scored based on a matching of the criteria; and the hyperlink with the highest score is designated as the active hyperlink;

direct said recipient of said electronic message to an online location of said active hyperlink in response to user input selecting said link label;

adjust the criteria used by the designating engine to designate the active hyperlink to create a first set of rules that are specific to individual recipients and a second set of rules that are applicable to a variety of recipients using data from a learning mechanism, wherein:

the first set of rules alters the criteria by which the active hyperlink is designated;

the learning mechanism utilizing information about the recipient's feedback regarding previously-selected active hyperlinks and characteristics of the recipient;

the characteristics of the recipient define the criteria; and the criteria is adjusted as the characteristics of the recipient change.

11. The computer program product of claim 10, further comprising program instructions that, when executed, causes said processor to direct said recipient of said electronic message to an online location of said active hyperlink.

12. The computer program product of claim 10, further comprising program instructions that, when executed, causes said processor to generate a layered data element based on user input.

13. The computer program product of claim 10, further comprising program instructions that, when executed, causes said processor to designate said active hyperlink based on a geographic location factor.

14. The computer program product of claim 10, further comprising program instructions that, when executed, causes said processor to designate said active hyperlink based on a profession of the recipient.

15. The computer program product of claim 10, further comprising program instructions that, when executed, causes said processor to designate said active hyperlink based on a language factor.

16. The computer program product of claim 10, further comprising program instructions that, when executed, causes said processor to designate said active hyperlink based on a preference factor.

17. A system for presenting a link label for multiple hyperlinks, comprising:

a generating engine to generate a layered data element, the layered data element comprising a link label that represents multiple hyperlinks;

a presenting engine to present said link label in an electronic message, the presenting engine to present a drop down menu of the multiple hyperlinks adjacent to the link label;

a designating engine to designate at least one of the multiple hyperlinks as an active hyperlink based on specific criteria associated with a recipient of said electronic message, wherein:

the specific criteria comprises a score associated with the hyperlinks, the hyperlinks being scored based on matching the criteria, and the hyperlink with the highest score is designated as the active hyperlink; and a learning mechanism to:
  solicit feedback data from the recipient regarding the active hyperlink; and
  adjust criteria associated with a recipient of the electronic message and used by the designating engine to designate the active hyperlink to create a first set of rules that are specific to individual recipients and a second set of rules that are applicable to a variety of recipients, wherein:
    the first set of rules alters the criteria by which the designating engine designates the active hyperlink;
    the learning mechanism utilizes information about the recipient's feedback regarding previously-selected active hyperlinks and characteristics of the recipient, the characteristics of the recipient defining the criteria; and
    the criteria is adjusted as the characteristics of the recipient change.

18. The system of claim 17, further comprising a directing engine to direct said recipient to an online location of said active hyperlink in response to user input selecting said link label.

19. The system of claim 17, further comprising a displaying engine to display content associated with said active hyperlink in response to user input selecting said link label.

20. The system of claim 17, wherein said active hyperlink is a single hyperlink.

* * * * *